United States Patent Office 2,716,868
Patented Sept. 6, 1955

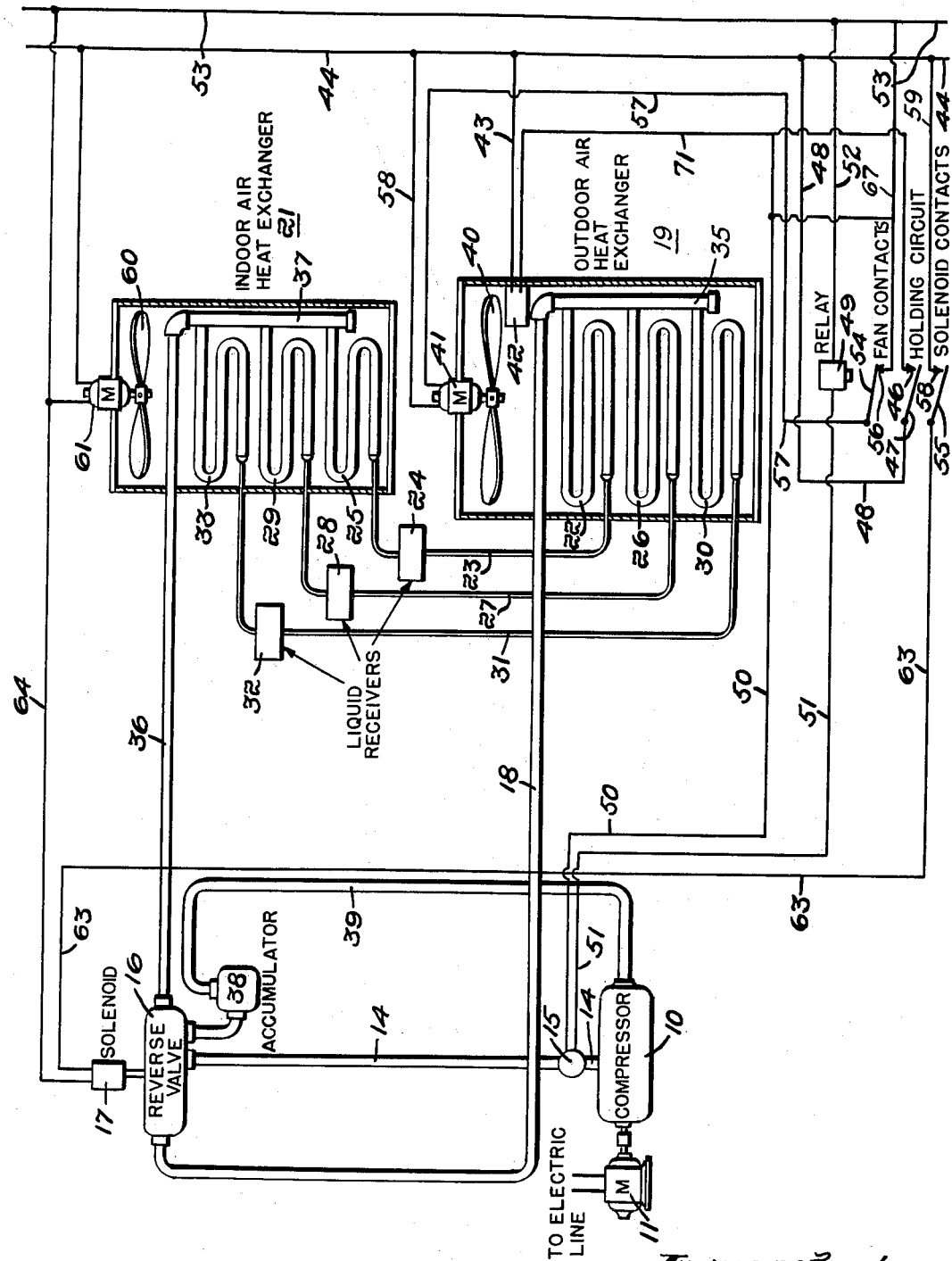

2,716,868

HEAT PUMP SYSTEMS

Gerald L. Biehn, Needham, Mass., assignor to Westinghouse Electric Corporation, East Pittsburgh, Pa., a corporation of Pennsylvania Application May 1, 1952, Serial No. 285,413

5 Claims. (Cl. 62—6)

This invention relates to heat pumps used for cooling air in summer and for heating air in winter.

In the usual heat pump, the indoor air heat exchanger which acts as the evaporator during the cooling cycle, and as the condenser during the heating cycle, is connected to the outdoor air heat exchanger which acts as the condenser during the cooling cycle and as the evaporator during the heating cycle, by piping containing an expansion valve for each of the two heat exchangers, and a by-pass connection around each expansion valve for by-passing refrigerant around the expansion valve which is inactive. Such expansion valves and by-pass connections are slow acting when the refrigerant reversal valve is operated for changing from cooling to heating and vice versa, and introduce excessive pressure losses.

In the Ditzler-Biehn application Serial No. 194,400, filed Nov. 7, 1950, now Pat. No. 2,672,734, the indoor air and outdoor air heat exchangers of a heat pump are provided with the same number of paths or circuits, and are connected by capillary tubes through which the refrigerant expands in both directions, thus eliminating the necessity for expansion valves and their by-passes.

This invention in one respect, is a modification of the heat pump of said Ditzler-Biehn application in that the outdoor air heat exchanger is made larger than the indoor air heat exchanger, with small liquid receivers in the capillary tubes for storing refrigerant charges during the heating cycle, which would tend to fill up the indoor air heat exchanger.

During the cooling cycle a small evaporator and a large condenser are desired since there is a low temperature differential between the outdoor air and the condensing temperature, but a larger temperature differential between the indoor air and the evaporating temperature. On the other hand, during the heating cycle a large evaporator and a small condenser are desired since there is but a small temperature differential between the outdoor air and the evaporating temperature, while there is a larger temperature differential between the indoor air and the condensing temperature.

During the heating cycle, different outdoor temperatures result in different refrigerant charges. For example, at 60 degrees F. outdoors, the load condition is high so that the weight of refrigerant required is high. At zero degrees F. outdoors the load condition is low so that a much smaller weight of refrigerant is required.

The outdoor air heat exchanger during the heating cycle, tends to fill-up the indoor air heat exchanger acting as a condenser at this time, and to decrease its efficiency. If a conventional accumulator was used to store the excess charge, it would have to be very large. More than a size problem is involved, however, since an accumulator of sufficient size to store the excess charge would trap almost all of the lubricating oil from the compressor.

The small liquid receivers connected in the capillary tubes between the indoor air and outdoor air heat exchangers as a feature of this invention, receive and store the excess liquid from the indoor air heat exchanger during the heating cycle, increasing the sub-cooling and preventing flooding of the condenser. Since the flow is straight through the receivers, they do not trap any oil. The receivers are of sufficient capacity to store the large weight of excess liquid involved in the highest load condition to be expected. During the cooling cycle the liquid boils out of the receivers and thus does not interfere with the evaporator since it acts as a flooded unit.

Ice forms on the surfaces of the outdoor air heat exchanger of a heat pump during the heating cycle when the outdoor temperatures are relatively low, and for removing this ice the usual method has been to stop the outdoor air fan and to operate the refrigerant reversal valve so that the outdoor air heat exchanger acts as a condenser for melting the ice, a timer being started at the same time, and which terminates the defrosting period after a predetermined period of time. Such timers are not only costly but operate at a fixed period of time which may be too long or too short for a particular condition.

This invention provides a defrosting control for a heat pump which includes a pressurestat responsive to the increase in pressure drop through the outdoor air heat exchanger caused by the presence of ice, to energize a relay that stops the outdoor air fan and operates the refrigerant reversal valve, and also closes holding contacts which prevent the relay from becoming deenergized when the fan stops. Another pressurestat responsive to the refrigerant discharge pressure deenergizes the relay and returns the heat pump to air heating operation when the refrigerant discharge pressure rises as a result of the ice melting from the outdoor air heat exchanger.

An object of this invention is to use capillary tubes for interconnecting an indoor air heat exchanger and a larger outdoor air heat exchanger of a heat pump for expanding the refrigerant in both directions, and to use a receiver in each capillary tube to store excess refrigerant charges during air heating operation.

Another object of this invention is to provide an improved defrosting control for a heat pump used for heating air in winter.

The invention will now be described with reference to the drawing, which is a schematic diagram of a heat pump and its control system according to this invention.

The refrigerant compressor 10 driven by the electric motor 11, has its high side connected by the piping 14 and pressurestat 15 to the refrigerant reversal valve 16 which is controlled by the solenoid 17.

The reversal valve 16 and solenoid 17 are similar to those described in said Ditzler-Biehn application, the valve containing a piston operated by refrigerant gas under control of the solenoid.

The valve 16, in air cooling position, supplies refrigerant gas from the piping 14 through the piping 18 to the outdoor air heat exchanger 19 which acts as condenser, through the capillary tubes 23, 27 and 31 and receivers 24, 28 and 32 respectively, to the indoor air heat exchanger 21 acting as evaporator, then through the piping 36, reversal valve 16, accumulator 38 and piping 39 back to the compressor 10. The valve 16 in air heating position routes refrigerant through the piping 36, the indoor air heat exchanger 21 acting as condenser, the capillary tubes and receivers, the outdoor air heat exchanger acting as evaporator, the piping 18 and back to the compressor.

The accumulator 38 serves only as a trap for preventing any liquid from entering the compressor.

The indoor air heat exchanger is smaller than the outdoor air heat exchanger and preferably, although not necessarily, is located above the receivers 24, 28 and 32 so that excess liquid, during the heating cycle, can drain into the receivers. Both heat exchangers have the same number of refrigerant circuits or paths.

One end of a tube 22 of the heat exchanger 19 is connected by a capillary tube 23 and liquid receiver 24 to an end of a corresponding tube 25 of the heat exchanger 21. Likewise one end of a tube 26 of the heat exchanger 19 is connected by the capillary tube 27 and receiver 28 to an end of the corresponding tube 29 of the heat exchanger 21. Likewise one end of a tube 30 of the heat exchanger 19 is connected by the capillary tube 31 and the receiver 32 to an end of the corresponding tube 33 of the heat exchanger 21.

The ends of the tubes 22, 26 and 30 of the heat exchanger 19, opposite the ends connected to the capillary tubes, are connected to the header 35 which is connected by the piping 18 to the reversal valve 16. The tubes 25, 29 and 33 of the heat exchanger 21, opposite the ends connected to the capillary tubes, are connected to the header 37 which is connected by the piping 36 to the reversal valve 16.

The indoor air heat exchanger 21 has a fan 60 driven by the electric motor 61 for moving indoor air over the surfaces of the heat exchanger 21.

The outdoor air heat exchanger has the fan 40 driven by the electric motor 41 for moving outdoor air over the surfaces of the heat exchanger 19, and has the pressurestat 42 which responds to an increase in air pressure drop through the heat exchanger 19 caused by the formation of ice on its surfaces at very low outdoor temperatures. The pressurestat 42 contains the usual switch connected in series with the wires 43 and 71. The wire 43 is connected to the power line wire 44 to which the holding circuit relay armature 47 is connected so that the contact 46 and armature 47 are in parallel with the switch of the pressurestat 42. The wire 71 is connected through the wire 50 to one side of the refrigerant pressurestat 15, the other side of which is connected in series with the energizing winding of the relay 49 and the wire 52 to the other power line wire 53. The contact 46 and armature 47 are bridged across the switch of the pressurestat 42 so that when the relay 49 is energized and pulls-up its armature 47 against the contact 46, the circuit later to be described that is closed by the pressurestat 42 remains closed, when the switch of the pressurestat 42 opens, as long as the relay is energized.

Assuming the heat pump is operating to heat indoor air, when the switch of the pressurestat 42 closes as a result of the formation of ice on the outdoor air heat exchanger acting as evaporator, it closes a circuit including the wires 43, 71 and 50, the pressurestat 15, the wire 51, the energizing coil of the relay 49, the wire 52 and the power line wires 44 and 53. The switch in the pressurestat 15 will be closed at this time since the discharge pressure is relatively low due to the ice on the outdoor heat exchanger.

The relay 49 is energized and pulls up its armatures 47, 54 and 55. The armature 54 leaves the contact 56 causing the energizing circuit of the outdoor air fan motor 41 to be opened, which circuit can be traced from the line wire 53, through the wire 67, the contact 56, the relay armature 54, the wire 57, the fan motor 41 and the wire 58 to the other electric main wire 44. The fan 40 then stops so that cold outdoor air is no longer blown over the outdoor air heat exchanger. The pressurestat 42 will now open its switch but the previously described holding circuit including the relay contact 46 and armature 47 is closed, and maintains the relay 49 energized until the pressurestat 15 opens its switch.

The relay contact 58 is connected by the wire 59 to the power line 44. The corresponding relay armature 55 is connected by the wire 63 to one side of the solenoid 17, the other side of which is connected by the wire 64 to the other power line 53. Therefore, when the relay is energized as a result of ice forming on the outdoor air heat exchanger, it energizes the solenoid 17 causing it to operate the reversal valve 16 to change from air heating to air cooling with the outdoor air heat exchanger acting as condenser. The condenser heat melts the ice so that the refrigerant discharge pressure rises and opens the switch of the pressurestat 15, thus deenergizing the relay 49 and restoring the heat pump to the air heating cycle.

When the heat pump is operating on the cooling cycle with the indoor air heat exchanger acting as evaporator, any liquid in the receivers 24, 28 and 32 boils away and does not interfere with the operation of the evaporator. The refrigerant expands through the capillary tubes into the evaporator.

During the heating cycle with the outdoor air heat exchanger acting as evaporator, and the indoor air heat exchanger acting as condenser, refrigerant is expanded through the capillary tubes into the outdoor air heat exchanger. The excess refrigerant which would tend to fill up the indoor heat exchanger, passes from the indoor air heat exchanger into the receivers, thus maintaining the condensing efficiency of the indoor air heat exchanger.

While one embodiment of the invention has been described for the purpose of illustration, it should be understood that the invention is not limited to the exact apparatus and arrangement of apparatus illustrated since modifications thereof may be suggested by those skilled in the art without departure from the essence of the invention.

What I claim as my invention is:

1. A heat pump system comprising a refrigerant compressor, an indoor air heat exchanger, an outdoor air heat exchanger and a refrigerant reversal valve connected in a refrigerant circuit; a fan for moving outdoor air through said outdoor air heat exchanger; a motor for driving said fan; a relay; means including a pressurestat responsive to an increase in pressure drop in the air passing through said outdoor air heat exchanger when it is acting as an evaporator in said circuit and ice forms on the surface of said outdoor air heat exchanger for energizing said relay, and means controlled by the energization of said relay for stopping said fan motor and for actuating said reversal valve to operate said outdoor air heat exchanger as condenser, said relay having holding contacts connected to said pressurestat for maintaining said relay energized when said pressurestat becomes inoperative to energize said relay as a result of the stopping of said fan motor.

2. A heat pump system as claimed in claim 1 in which means including a pressurestat responsive to discharge pressure of said compressor de-energizes said relay when ice has melted from the surface of said outdoor air heat exchanger.

3. A heat pump system comprising a refrigerant compressor, an indoor air heat exchanger, an outdoor air heat exchanger and a refrigerant reversal valve connected in a refrigerant circuit; a fan for moving outdoor air through said outdoor air heat exchanger; a motor for driving said fan; a pressurestat responsive to an increase in pressure drop in the air passing through said outdoor air heat exchanger when it is acting as evaporator in said circuit and ice forms on its surface; relay means; means including said pressurestat for actuating said relay means to stop said fan motor and to actuate said valve to operate said outdoor air heat exchanger as condenser in said circuit, and means including means included in said relay means for maintaining it actuated when said pressurestat becomes inoperative when said fan motor stops.

4. A heat pump system as claimed in claim 3 in which means is provided for actuating said relay means to start said fan motor and to actuate said reversal valve to operate said outdoor air heat exchanger as evaporator when ice has melted from the surface of said outdoor air heat exchanger.

5. A heat pump system as claimed in claim 4 in which the means for actuating the relay means when ice has melted from the surface of the outdoor air heat exchanger, includes a pressurestat responsive to the discharge pressure of the compressor.

References Cited in the file of this patent

UNITED STATES PATENTS

| | | |
|---|---|---|
| 2,148,415 | Labberton | Feb. 21, 1939 |
| 2,303,857 | Numero | Dec. 1, 1942 |
| 2,452,102 | Cocanour | Oct. 26, 1948 |